T. H. EULASS.
Harvester Cutting Apparatus.

No. 207,169. Patented Aug. 20, 1878.

Attest
Horace E. Johnson
Walter Knight

Thomas H. Eulass,
By Knight Bros.
Attys.

UNITED STATES PATENT OFFICE.

THOMAS H. EULASS, OF CINCINNATI, OHIO.

IMPROVEMENT IN HARVESTER CUTTING APPARATUS.

Specification forming part of Letters Patent No. 207,169, dated August 20, 1878; application filed November 2, 1877.

*To all whom it may concern:*

Be it known that I, THOMAS H. EULASS, of Cincinnati, Hamilton county, Ohio, have invented a new and useful Improvement in Harvester Cutter-Bars, of which the following is a specification:

My improvement consists in combining with a harvester cutter-bar and crank wrist-pin a yoke having an adjustable side and a divided boxing for the wrist-pin, so as to form dual adjustments, as hereinafter described.

Figure 1:
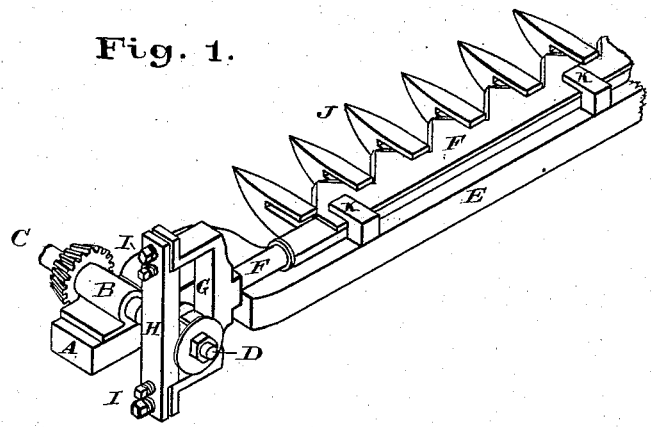
Figure 2:
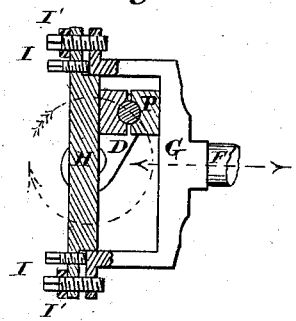
Figure 3:
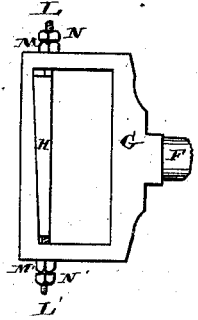
Figure 4:
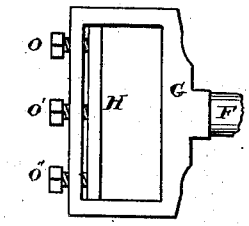

In the accompanying drawings, Figure 1 is a perspective view of a harvester sickle-bar embodying my improvement, said bar being shown in position within the finger-bars and inclosing the crank-wrist, a portion of both sickle and finger bars being broken away. Fig. 2 is a side elevation of the slotted heel. Figs. 3 and 4 represent modifications of such heel.

A may represent a portion of the main frame of a harvester, affording journal-bearing B to shaft C of crank D, driven by customary geared connection with the ground-wheel. E represents a customary finger-bar. F is my sickle-bar, having at its heel end, in place of the usual round eye, the represented transverse slotted projection or yoke G, for the divided box P of the crank-wrist. One side or jaw, H, of yoke G is adjustable inward by means of screws I, having jam-nuts I'.

The sickle-bar is guided to its proper rectilinear path by customary fingers J and clips K.

The adjustable jaw may be of wedge form, as shown in Fig. 3, and may terminate in screws L L', having adjusting-nuts M M' and jam-nuts N N', said wedge-jaw abutting against the correspondingly oblique face of the yoke side; or it may be set forward by screws, as at O O' O'', Fig. 4. These adjustments enable the jaw to be shifted or set up, when necessary, to compensate for any wear of the box, either upon the wrist-pin or against the yoke-bearings, the sections of the box being out of contact with each other, so as to admit of adjustment one toward the other.

Having thus described my invention, the following is what I claim as new and desire to secure by Letters Patent:

The divided box P and yoke G, having adjustable side H, forming dual adjustments, for taking up wear of the box on the wrist-pin and yoke-bearings, in combination with a cutter-bar, F, and crank-wrist pin D, substantially as shown and described.

In testimony of which invention I hereunto set my hand.

T. H. EULASS.

Attest:
GEO. H. KNIGHT,
GEORGE H. KOLKER.